United States Patent
Oota (10) Patent No.: US 7,653,917 B2
(45) Date of Patent: Jan. 26, 2010

(54) DISK APPARATUS FOR LIMITING THE VERTICAL MOVEMENT OF A CAM MECHANISM

(75) Inventor: Hidehiko Oota, Ehime (JP)

(73) Assignee: Panasonic Corporation, Osaka (JP)

( * ) Notice: Subject to any disclaimer, the term of this patent is extended or adjusted under 35 U.S.C. 154(b) by 692 days.

(21) Appl. No.: 10/585,116

(22) PCT Filed: Nov. 8, 2004

(86) PCT No.: PCT/JP2004/016894

§ 371 (c)(1),
(2), (4) Date: Jun. 30, 2006

(87) PCT Pub. No.: WO2005/093741

PCT Pub. Date: Oct. 6, 2005

(65) Prior Publication Data

US 2009/0013339 A1    Jan. 8, 2009

(30) Foreign Application Priority Data

Mar. 25, 2004    (JP)    ............................ 2004-088158

(51) Int. Cl.
*G11B 17/04* (2006.01)
(52) U.S. Cl. ...................................... 720/623; 720/619
(58) Field of Classification Search .................. 720/620, 720/652, 653, 655, 600, 619, 623, 622
See application file for complete search history.

(56) References Cited

U.S. PATENT DOCUMENTS

| | | | | |
|---|---|---|---|---|
| 6,388,974 B1* | 5/2002 | Kato | ........................... | 720/627 |
| 6,731,582 B2* | 5/2004 | Abe | ........................... | 720/700 |
| 2002/0067687 A1* | 6/2002 | Kato | ........................... | 369/271 |
| 2002/0150027 A1* | 10/2002 | Kato | ........................... | 369/270 |
| 2003/0214896 A1* | 11/2003 | Konno et al. | ................ | 369/75.2 |

FOREIGN PATENT DOCUMENTS

| | | |
|---|---|---|
| JP | 2002-352497 | 12/2002 |
| JP | 2002-352498 | 12/2002 |

* cited by examiner

*Primary Examiner*—Craig A Renner
*Assistant Examiner*—Tamara Ashford
(74) *Attorney, Agent, or Firm*—Dickinson Wright, PLLC (57) ABSTRACT

A disk apparatus includes a chassis outer sheath with a base body and a lid. A slider mechanism is disposed on one end of a traverse, the slider mechanism includes a vertically moving cam mechanism which brings the traverse close to and away from the base body. A cam groove of the vertically moving cam mechanism has a first cam portion which moves together with the slider mechanism and a second cam portion which is displaced with respect to the first cam portion. When a vertically moving pin of the vertically moving cam mechanism exceeds a predetermined height in the cam groove, the second cam portion rises and the second cam portion limits movement of the vertically moving pin. When the vertically moving pin is equal to or lower than the predetermined height in the cam groove, the second cam portion is held at its lowered position.

9 Claims, 12 Drawing Sheets

DISK APPARATUS FOR LIMITING THE VERTICAL MOVEMENT OF A CAM MECHANISM

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method in which a conveying roller is abutted against a disk surface to pull the disk in (e.g., a patent document 1).

According to the slot-in type as proposed in the patent document 1, however, since a conveying roller which is longer than a diameter of the disk is used, the width of the apparatus must be increased, and the thickness of the apparatus is also increased due to this conveying roller.

From this reason, the slot-in type disk apparatus which conveys a disk by a lever is suitable for reducing the thickness and size of the disk apparatus body (e.g., a patent document 2).

According to an apparatus of the invention of the patent document 2, a slider mechanism is disposed on the one end of a traverse, and the slider mechanism is provided with a vertically moving cam mechanism which brings the traverse close to and away from the base body.

(Patent Document 1)
Japanese Patent Application Laid-open No. H7-220353
(Patent Document 2)
Japanese Patent Application Laid-open No. 2002-352498

In the apparatus of the invention of the patent document 2, the slider mechanism must be provided with the vertically moving cam mechanism which corresponds to a distance through which the traverse is separated away from the base body.

Therefore, the height of the vertically moving cam mechanism poses a limit for reducing the disk apparatus body in thickness or size.

Thereupon, it is an object of the present invention to provide a disk apparatus capable of reducing the apparatus in thickness and size without being affected by the height of the vertically moving cam mechanism.

DISCLOSURE OF THE INVENTION

According to a first aspect of the present invention, there is provided a disk apparatus comprising a chassis outer sheath having a base body and a lid, in which a front surface of the chassis outer sheath is formed with a disk inserting opening into which a disk is directly inserted, a spindle motor and a pickup are held by a traverse provided on the base body, a slider mechanism is disposed on one end of the traverse, the slider mechanism includes a vertically moving cam mechanism which brings the traverse close to and away from the base body, wherein a cam groove of the vertically moving cam mechanism comprises a first cam portion which moves together with the slider mechanism and a second cam portion which is displaced with respect to the first cam portion, when a vertically moving pin of the vertically moving cam mechanism exceeds a predetermined height in the cam groove, the second cam portion rises and the second cam portion limits movement of the vertically moving pin, and when the vertically moving pin is equal to or lower than the predetermined height in the cam groove, the second cam portion is held at its lowered position.

According to this aspect, when the vertically moving pin exceeds the predetermined height in the cam groove, the second cam portion rises, and when the vertically moving pin is equal to or lower than the predetermined height in the cam groove, the second cam portion is held at its lowered position. With this, it is possible to reduce the height of the vertically moving cam mechanism.

According to a second aspect of the invention, in the disk apparatus of the first aspect, when the vertically moving pin exceeds the predetermined height in the cam groove, the second cam portion rises to a height where the cam groove is formed, and the vertically moving pin is limited by a spring or a stopper so that the vertically moving pin does not rise more than a height at which the cam groove is formed.

According to the second aspect, the second cam portion rises only when the vertically moving pin exceeds the predetermined height in the cam groove, it is possible to reduce the height of the vertically moving cam mechanism.

According to a third aspect of the invention, in the disk apparatus of the first aspect, the second cam portion limits an upper surface of the vertically moving pin.

According to the third aspect, the second cam portion can be provided on an upper portion of the first cam portion like a lid. Therefore, it is possible to realize the vertically moving cam mechanism with a simple structure.

According to a fourth aspect of the invention, in the disk apparatus of the first aspect, one end of the second cam portion is turnably held by the first cam portion so that the other end of the second cam portion can vertically move, a resilient member downwardly biases the other end of the second cam portion.

According to the fourth aspect, since the slider mechanism is provided with the first cam portion and the second cam portion, it is possible to assemble the members easily.

According to a fifth aspect of the invention, in the disk apparatus of the first aspect, the second cam portion is downwardly biased using the resilient member.

According to the fifth aspect, when the vertically moving pin is equal to or lower than the predetermined height in the cam groove, it is possible to stably hold the second cam portion in its lowered position by the resilient member.

According to a sixth aspect of the invention, in the disk apparatus of the first aspect, a portion of the second cam portion is provided with a lower limiting cam wall which limits a lower side of the vertically moving pin, and when the vertically moving pin is equal to or lower than the predetermined height in the cam groove, the vertically moving pin presses the lower limiting cam wall of the second cam portion, and holds the second cam portion in its lowered position.

According to the sixth aspect, the second cam portion is allowed to move by the vertically moving pin.

According to a seventh aspect of the invention, in the disk apparatus of the first aspect, the base body is provided with a limiting member for limiting a vertical direction of the second cam portion, the second cam portion is provided with a receiver for receiving the limiting member, and by forward and backward motion of the second cam portion, at a predetermined position, the limiting member presses the receiver of the second cam portion, thereby holding the second cam portion in its lowered position.

According to the seventh aspect, when the vertically moving pin is equal to or lower than the predetermined height in the cam groove, it is possible to stably hold the second cam portion in its lowered position by the limiting member.

According to an eighth aspect of the invention, in the disk apparatus of the first aspect, the base body is provided with the second cam portion and with this, the second cam portion does not move together with the slider mechanism.

The second cam portion can also be provided separately from the slider mechanism as in this aspect.

A ninth aspect of the invention provides a disk apparatus in which a slider mechanism is disposed on one end of a traverse, the slider mechanism includes a vertically moving cam mechanism which brings one end of the traverse close to and away from the base body, wherein a cam groove of the vertically moving cam mechanism comprises a first cam portion which moves together with the slider mechanism and a second cam portion which is displaced with respect to the first cam portion to limit an upper surface of a vertically moving pin, when the vertically moving pin of the vertically moving cam mechanism exceeds a predetermined height in the cam groove, the second cam portion rises and the second cam portion limits movement of the vertically moving pin, and when the vertically moving pin is equal to or lower than the predetermined height in the cam groove, the second cam portion is held at a lowered position.

According to this aspect, when the vertically moving pin exceeds the predetermined height in the cam groove, the second cam portion rises, and when the vertically moving pin is equal to or lower than the predetermined height in the cam groove, the second cam portion is held at its lowered position. With this, it is possible to reduce the height of the vertically moving cam mechanism.

BEST MODE FOR CARRYING OUT THE INVENTION

A disk apparatus according to an embodiment of the present invention will be explained.

Figure 1:
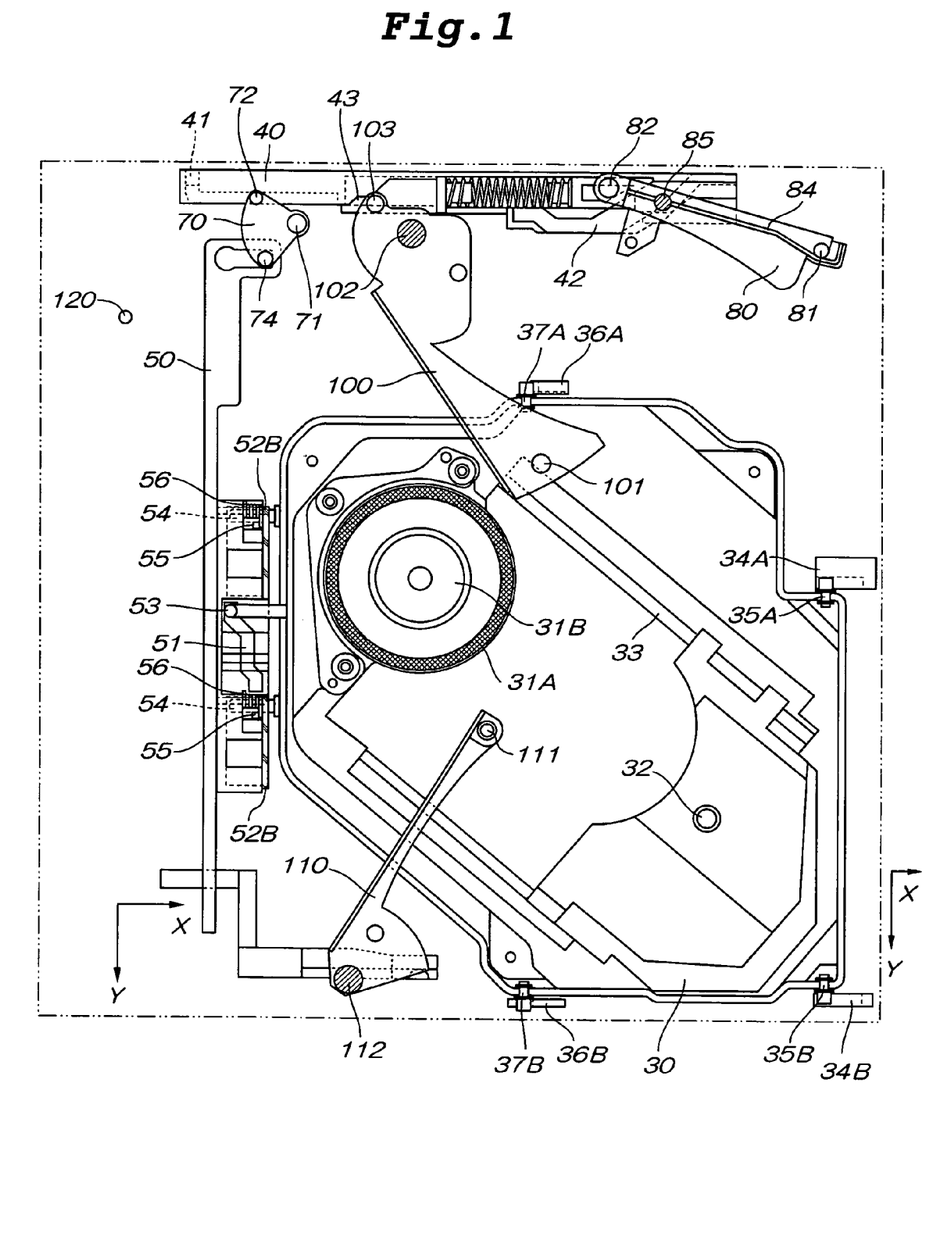
FIG. 1 is a plan view of an essential portion of a base body of a disk apparatus according to an embodiment of the present invention.
Figure 2:
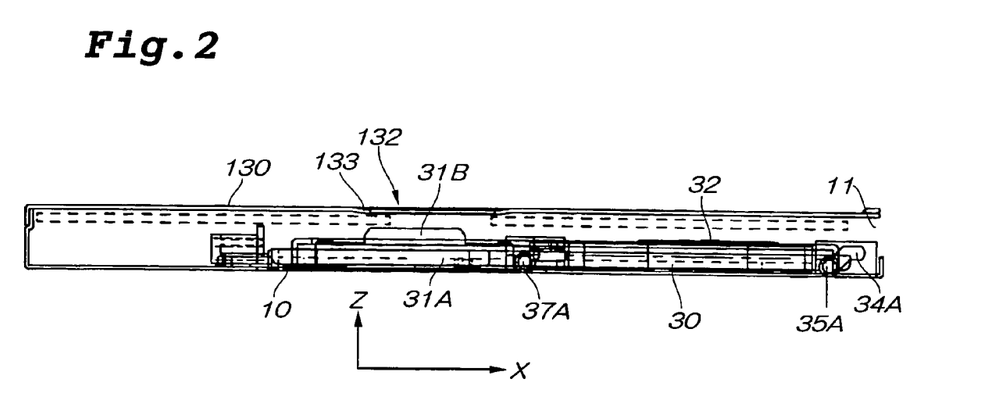
FIG. 2 is a side sectional view of an essential portion of the disk apparatus.
Figure 3:
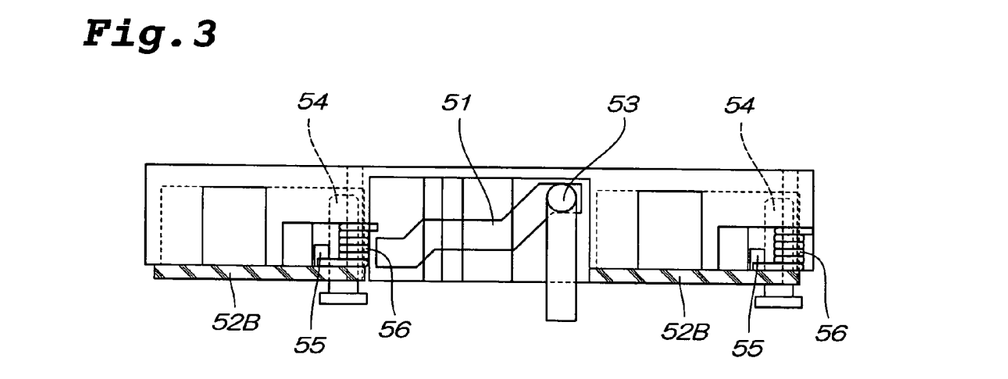
FIG. 3 is a plan view of a sub-slider of the disk apparatus.
Figure 4:
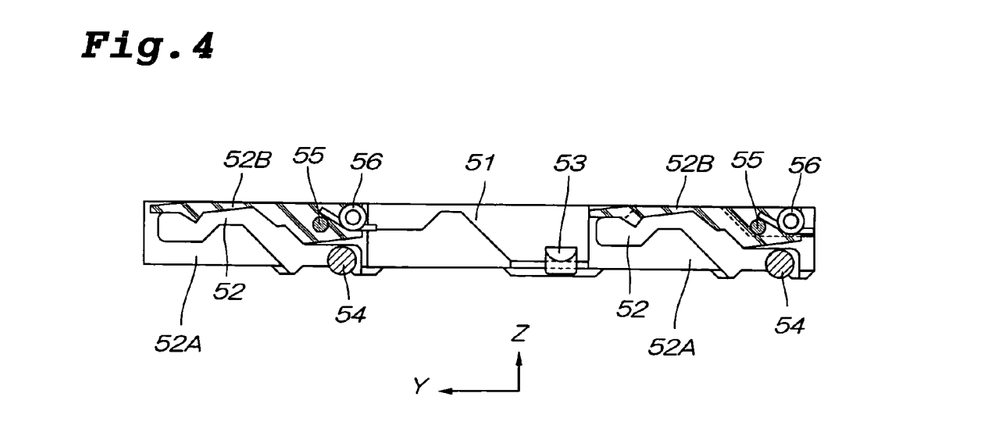
FIG. 4 is a side view of the sub-slider of the disk apparatus.

FIG. 1 is a plan view of an essential portion of a base body of a disk apparatus according to the embodiment. FIG. 2 is a side sectional view of an essential portion of the disk apparatus. FIG. 3 is a plan view of a sub-slider of the disk apparatus. FIG. 4 is a side view of the sub-slider of the disk apparatus.

The disk apparatus of this embodiment includes a chassis outer sheath comprising a base body and a lid. A bezel is mounted on a front surface of the chassis outer sheath. The disk apparatus of this embodiment is a slot-in type disk apparatus in which a disk is directly inserted from a disk inserting opening formed in the bezel.

A disk inserting opening 11 into which a disk is directly inserted is formed in a front side of a base body 10. A traverse 30 is disposed in the base body 10.

The traverse 30 holds a spindle motor 31A, a pickup 32, and drive means 33 for moving the pickup 32. A rotation shaft of the spindle motor 31A includes a hub 31B for holding a disk. The spindle motor 31A is provided on one end of the traverse 30. The pickup 32 is disposed on the other end of the traverse 30 in a standby state or a chucking state. The pickup 32 can move from one end to the other end of the traverse 30. The drive means 33 includes a drive motor, a pair of rails for allowing the pickup 32 to slide, and a gear mechanism for transmitting a driving force of the drive motor to the pickup 32. The pair of rails are disposed on the opposite sides of the pickup 32 such that the one end and the other end of the traverse 30 are in contact with each other.

In the traverse 30, the spindle motor 31A is located at a central portion of the base body 10, a reciprocating range of the pickup 32 is located closer to the disk inserting opening 11 than the spindle motor 31A, and a reciprocating direction of the pickup 32 is different from an inserting direction of the disk. Here, an angle formed between the reciprocating direction of the pickup 32 and the inserting direction of the disk is 40 to 45°.

The traverse 30 is supported on the base body 10 by a pair of fixing cams 34A and 34B. It is preferable that the pair of fixing cams 34A and 34B are disposed closer to the pickup 32 than the spindle motor 31A and are disposed closer to the disk inserting opening 11 than the standby position of the pickup 32. In this embodiment, the fixing cam 34A is provided at a central portion in the vicinity of an inside of the disk inserting opening 11, and the fixing cam 34B is provided on the one end in the vicinity of the inside of the disk inserting opening 11. The fixing cams 34A and 34B comprise grooves of predetermined lengths extending in the inserting direction of the disk. One end of each of the grooves closer to the one end of the disk inserting opening 11 is separated away from the base body 10 than the other end by a first Z axis distance. Cam pins 35A and 35B provided on the traverse 30 slide in the grooves of the fixing cams 34A and 34B, thereby displacing the traverse 30 in the inserting/discharging direction (X axis direction) of the disk and displacing the traverse 30 in a direction (Z axis direction) in which the traverse 30 is brought close to and away from the base body 10.

A main slider 40 and a sub-slider 50 which move the traverse 30 will be explained next.

The main slider 40 and the sub-slider 50 are disposed on the spindle motor 31A side, and constitute a slider mechanism. One end of the main slider 40 is disposed in a direction of the front surface of a base body 10 and the other end thereof is disposed in a direction of a rear surface of the base body 10. The sub-slider 50 is disposed in a direction intersecting with the main slider 40 at right angles.

A cam mechanism for displacing the traverse 30 comprises a slider cam mechanism 51 and a vertically moving cam mechanism 52. The cam mechanism is provided on the sub-slider 50. The slider cam mechanism 51 comprises a groove of a predetermined length extending in a moving direction of the sub-slider 50. This groove approaches the disk inserting opening 11 (X axis direction) in stages from its one end side (the main slider 40 side) toward the other end. The traverse 30 is provided with a slide pin 53. The slide pin 53 slides in the groove of the slider cam mechanism 51, thereby displacing the traverse 30 in the inserting/discharging direction (X axis direction) of the disk. The vertically moving cam mechanism 52 comprises a groove of a predetermined length extending in the moving direction of the sub-slider 50. A distance (Z axis distance) of the groove is varied in stages from its one end side (the main slider 40 side) toward the other end. The vertically moving pin 54 provided on the traverse 30 slides in the groove of the vertically moving cam mechanism 52, thereby displacing the traverse 30 in a direction (Z axis direction) in which the traverse 30 is brought close to and away from the base body 10.

Here, the vertically moving cam mechanism 52 comprises a first cam portion 52A and a second cam portion 52B which is displaced with respect to the first cam portion 52A. One end of the second cam portion 52B is turnably held on the first cam portion 52A by a turning fulcrum 55, and the other end of the second cam portion 52B can move vertically. The resilient member 56 downwardly biases the other end of the second cam portion 52B. The cam groove of the vertically moving cam mechanism 52 is formed of upper and lower sides of the first cam portion 52A, and a lower side of the second cam portion 52B. Therefore, the first cam portion 52A limits lower and upper surfaces of the vertically moving pin 54, and the second cam portion 52B limits an upper surface of the vertically moving pin 54. In a state where the second cam portion 52B is lowered, however, a portion of the cam groove of the vertically moving cam mechanism 52 is not constituted. When the vertically moving pin 54 exceeds a predetermined height in the cam groove, the other end of the second cam portion 52B rises, thereby forming the cam groove.

Although the first cam portion 52A is provided with the second cam portion 52B in this embodiment, the base body 10 may be provided with the second cam portion 52B. In this case, the second cam portion 52B does not move together with the sub-slider 50. In this case also, if the second cam portion 52B is arranged such that it can vertically move with respect to the base body 10, the second cam portion 52B is moved upward by the vertically moving pin 54, and is limited by a spring or a stopper so as not to rise more than a predetermined height.

A loading motor (not shown) is disposed on one end of the main slider 40. A drive shaft of the loading motor and one end of the main slider 40 are connected to each other through a gear mechanism (not shown).

The main slider 40 can slide in a longitudinal direction (X axis direction) by driving the loading motor. The main slider 40 is connected to the sub-slider 50 through a cam lever 70.

The cam lever 70 includes a turning fulcrum 71, the cam lever 70 is engaged with a cam groove 41 provided in the main slider 40 through a pin 72, and the cam lever 70 is engaged with a cam groove provided in the sub-slider 50 through a pin 74.

The cam lever 70 moves the sub-slider 50 in association with movement of the main slider 40, moves the slider cam mechanism 51 and the vertically moving cam mechanism 52 by the movement of the sub-slider 50, and displaces the traverse 30.

The traverse 30 is further supported on the base body 10 by a pair of fixing cams 36A and 36B also. It is preferable that the pair of fixing cams 36A and 36B are disposed between the fixing cams 34A and 34B and the sub-slider 50, and are disposed at intermediate positions between the fixing cams 34A and 34B and the sub-slider 50. The fixing cams 36A and 36B comprise grooves of predetermined lengths which are the same structures as those of the fixing cams 34A and 34B. Cam pins 37A and 37B provided on the traverse 30 slide in the fixing cams 36A and 36B, thereby displacing the traverse 30 in the inserting direction of the disk, and displacing the traverse 30 in a direction in which the traverse 30 is brought close to and away from the base body 10.

The above explained traverse 30, fixing cams 34A, 34B, 36A and 36B, main slider 40, sub-slider 50, and loading motor are provided on the base body 10, and form a disk-inserting space between a lid 130 and these members.

Next, a guide member for supporting a disk and a lever member for operating the disk will be explained.

A first disk guide (not shown) having a predetermined length is provided on one end side of the base body 10 closer to the disk inserting opening 11. The first disk guide has a groove having a U-shaped cross section as viewed from a disk inserting direction. The disk is supported by the groove.

A pulling-in lever 80 is provided on the other end side of the base body 10 closer to the disk inserting opening 11. A movable side end of the pulling-in lever 80 includes a second disk guide 81. The second disk guide 81 comprises a cylindrical roller, and the second disk guide 81 is turnably provided on the movable side end of the pulling-in lever 80. A groove is formed in an outer periphery of the roller of the second disk guide 81, and the disk is supported by this groove.

The pulling-in lever 80 is disposed such that its movable side end is operated on the disk inserting opening 11 side than its fixed side end, and the fixed side end includes a turning fulcrum 82. A third disk guide 84 having a predetermined length is provided between the movable side end and the fixed side end of the pulling-in lever 80. The pulling-in lever 80 includes a pin 85. The pin 85 slides in a cam groove 42 of the main slider 40, thereby operating the pulling-in lever 80. That is, the pulling-in lever 80 is operated such that as the main slider 40 moves, the second disk guide 81 is brought close to and away from the spindle motor 31A.

The base body 10 is provided with a discharging lever 100. A guide 101 is provided on a movable side end of one end of the discharging lever 100. The discharging lever 100 is provided at its other end with a turning fulcrum 102. The discharging lever 100 is operated in association with motion of the main slider 40 by a pin 103 and a cam groove 43.

A discharging lever 110 is provided on the base body 10 on the side opposed to the discharging lever 100. A guide 111 is provided on a movable side end of one end of the discharging lever 110. A turning fulcrum 112 is provided on the other end of the discharging lever 110. The discharging lever 110 moves in the same manner as that of the discharging lever 100.

The base body 10 is provided at its rear side with a fixing pin 120. The fixing pin 120 limits a position of a disk when the disk is loaded or chucked.

As shown in FIG. 2, the chassis outer sheath comprises the base body 10 and a lid 130. The lid 130 is provided at its central portion with an opening 132. The opening 132 is a circular opening having a radius greater than a center hole of the disk. Therefore, the opening 132 is larger than the hub 31B of the spindle motor 31A which is fitted into the center hole of the disk.

The opening 132 is formed at its outer periphery with a narrowed portion 133 projecting toward the base body 10.

A motion mechanism of the traverse 30 will be explained using FIGS. 1 to 20.

Positions of the cam mechanism and the pin in FIGS. 1 to 4 show a loading completion state of the disk.

Figure 5:
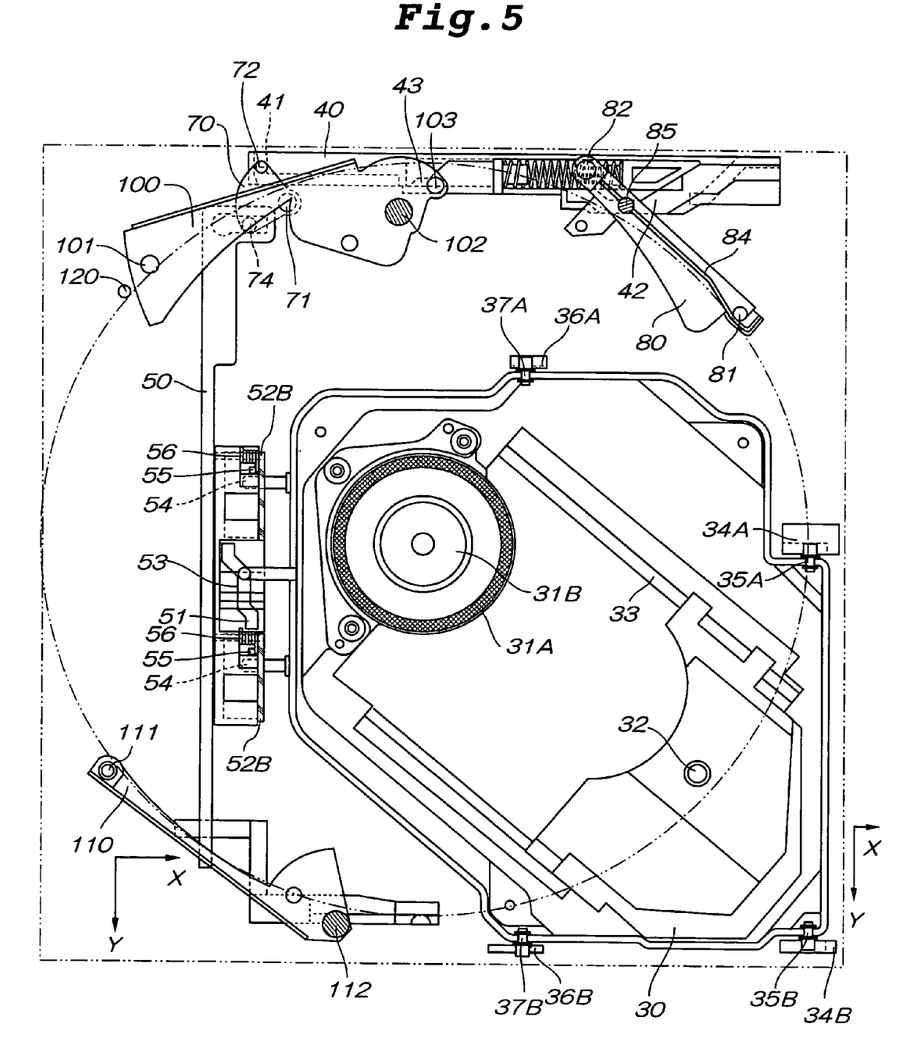
FIG. 5 is a plan view of an essential portion of the base body showing a state where a first predetermined time is elapsed after a chucking motion of a disk of the disk apparatus according to the embodiment is started.
Figure 6:
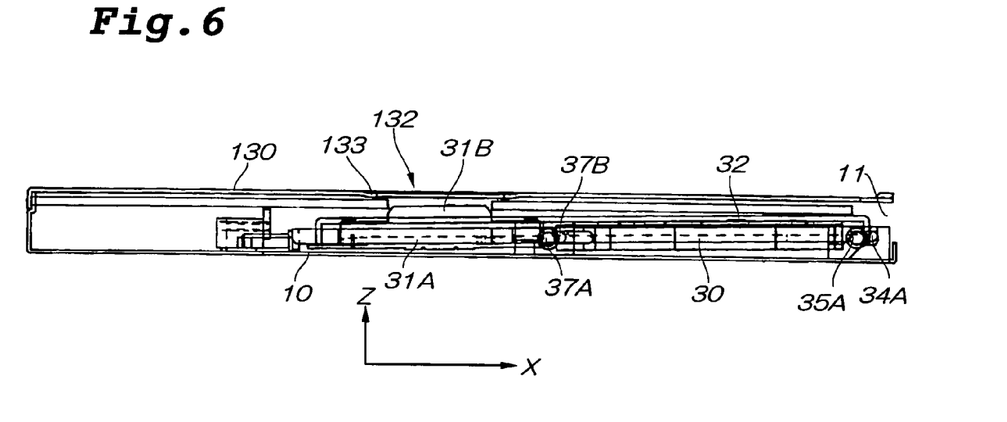
FIG. 6 is a side sectional view of an essential portion of this state.
Figure 7:
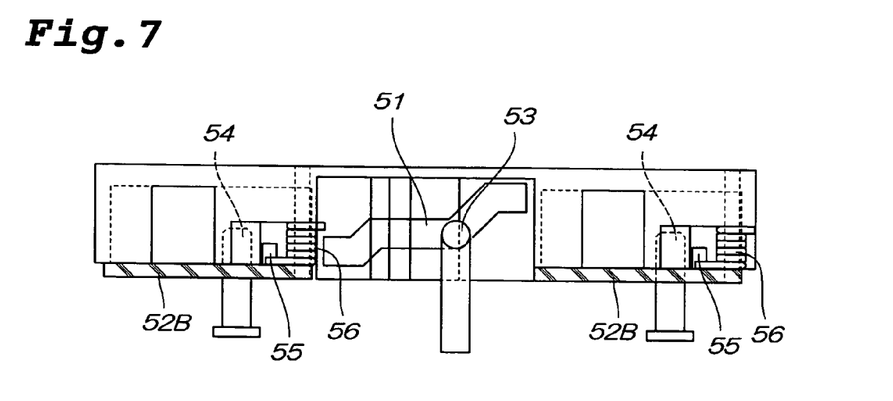
FIG. 7 is a plan view of the sub-slider in this state.
Figure 8:
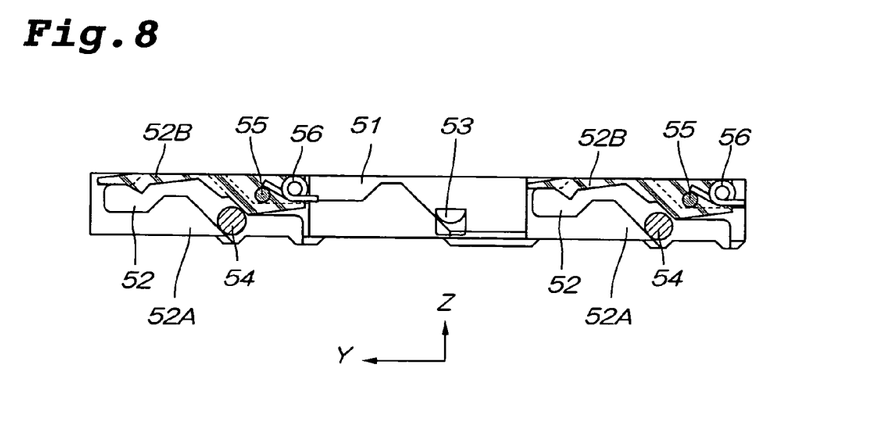
FIG. 8 is a side view of the sub-slider in this state.

FIG. 5 is a plan view of an essential portion of the base body showing a state where a first predetermined time is elapsed after the chucking motion of the disk of the disk apparatus of the embodiment is started, FIG. 6 is a side sectional view of an essential portion in this state, FIG. 7 is a plan view of the sub-slider in this state, and FIG. 8 is a side view of the sub-slider in this state.

Figure 9:
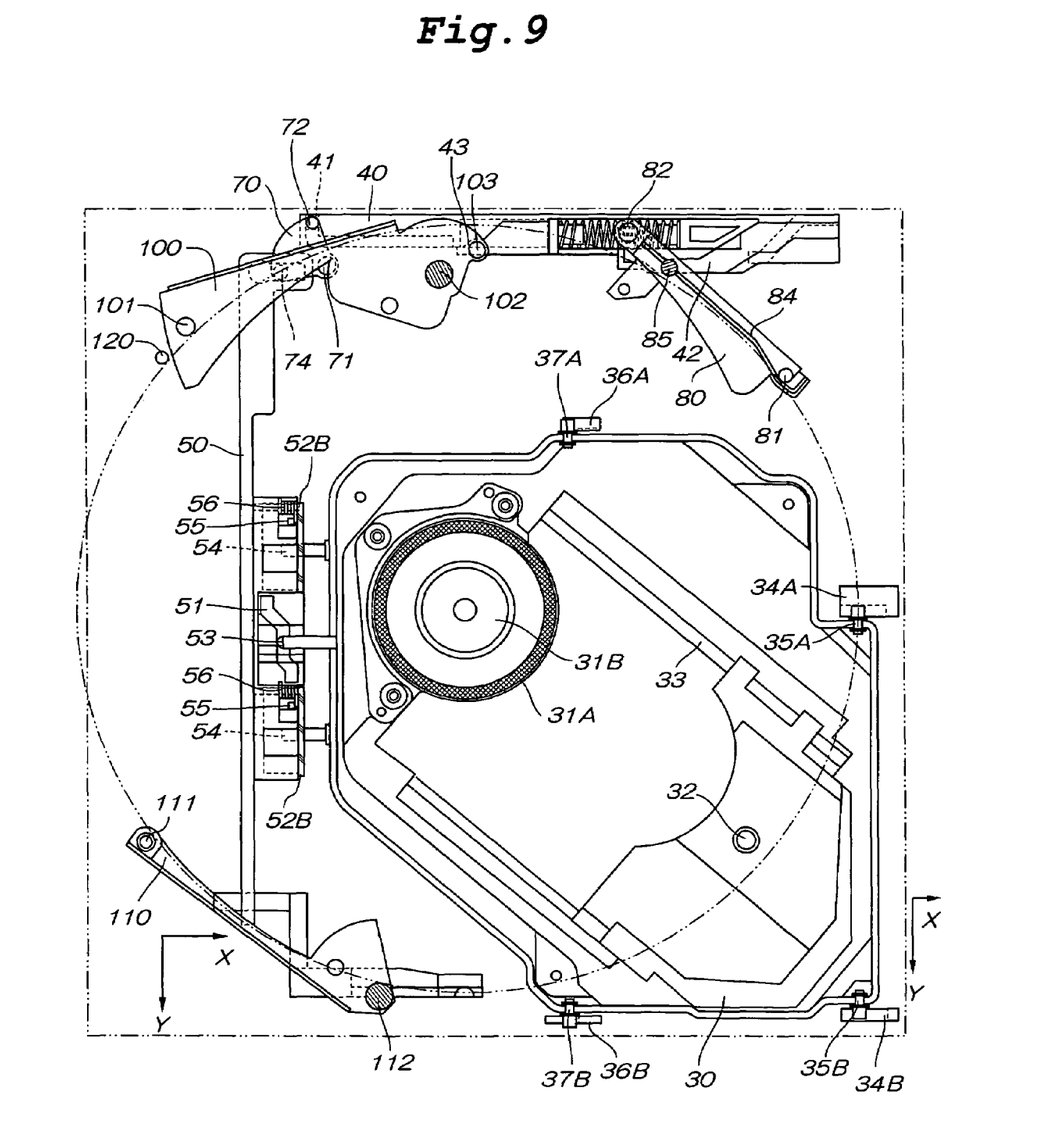
FIG. 9 is a plan view of an essential portion of a base body showing a state where a second predetermined time is elapsed after the sate shown in FIG. 5.
Figure 10:
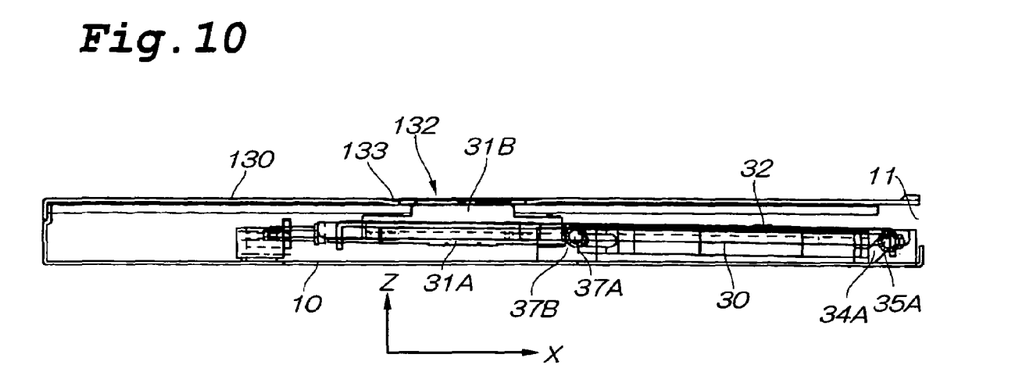
FIG. 10 is a side sectional view of an essential portion in the state.
Figure 11:
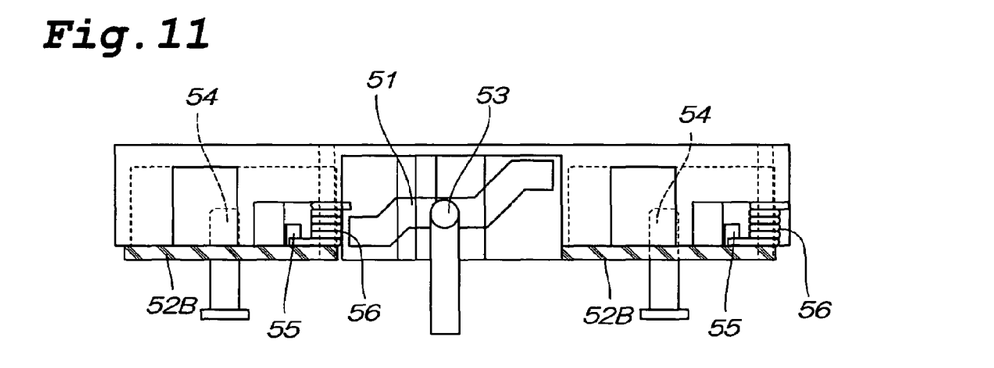
FIG. 11 is a plan view of a sub-slider in the state.
Figure 12:
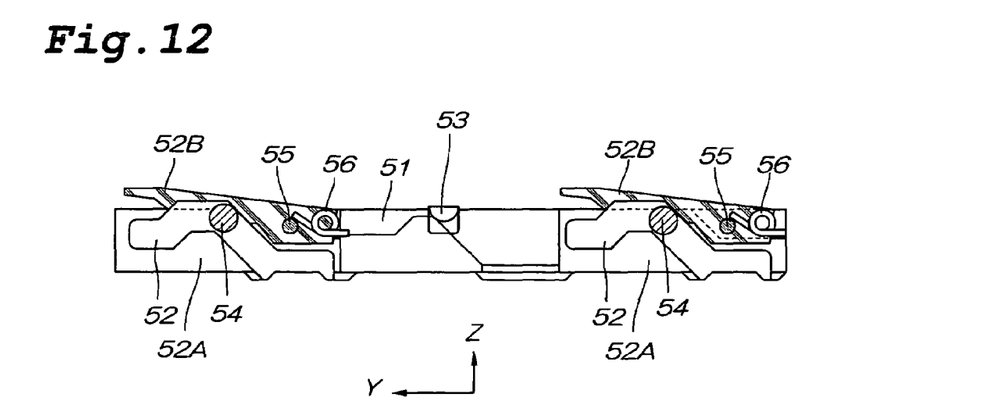
FIG. 12 is a side view of the sub-slider in the state.

FIG. 9 is a plan view of an essential portion of a base body showing a state where a second predetermined time is elapsed after the sate shown in FIG. 5, FIG. 10 is a side sectional view of an essential portion in the state, FIG. 11 is a plan view of a sub-slider in the state, and FIG. 12 is a side view of the sub-slider in the state.

Figure 13:
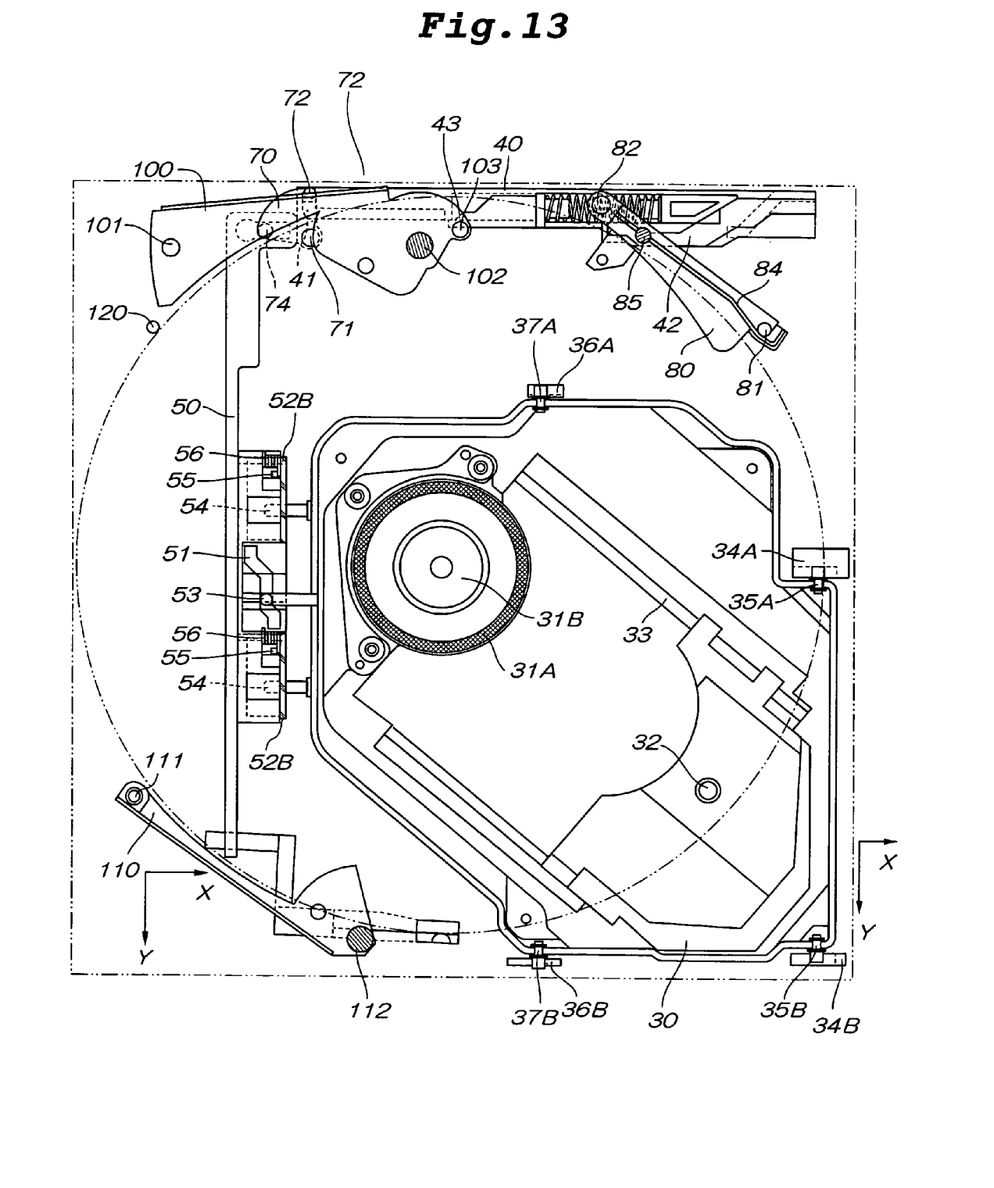
FIG. 13 is a plan view of an essential portion of a base body showing a state where a third predetermined time is elapsed after the state shown in FIG. 9 and the traverse is moved to the highest position.
Figure 14:
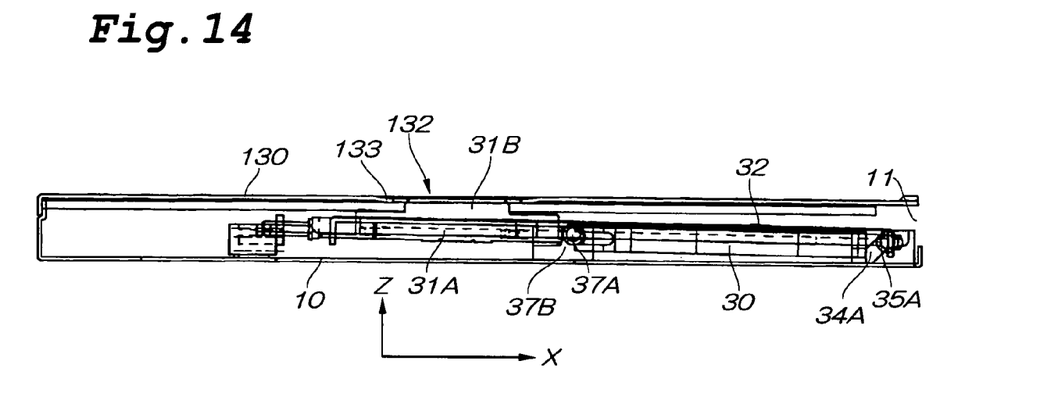
FIG. 14 is a side sectional view of an essential portion in the state.
Figure 15:
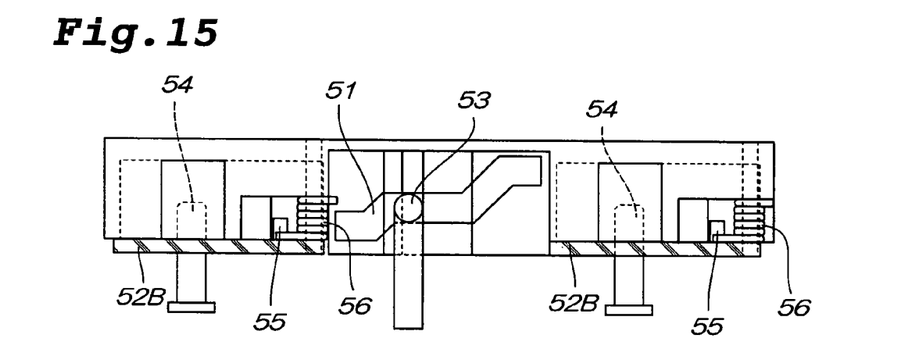
FIG. 15 is a plan view of a sub-slider in the state.
Figure 16:
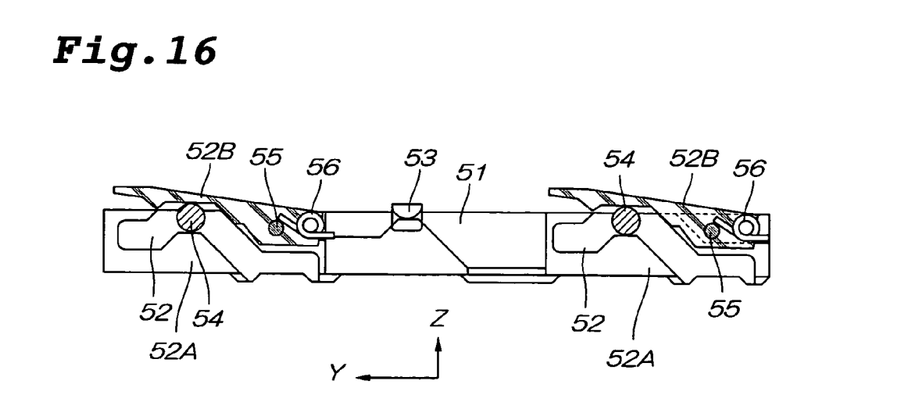
FIG. 16 is a side view of the sub-slider in the state.

FIG. 13 is a plan view of an essential portion of a base body showing a state where a third predetermined time is elapsed after the state shown in FIG. 9 and the traverse is moved to the highest position, FIG. 14 is a side sectional view of an essential portion in the state, FIG. 15 is a plan view of a sub-slider in the state, and FIG. 16 is a side view of the sub-slider in the state.

Figure 17:
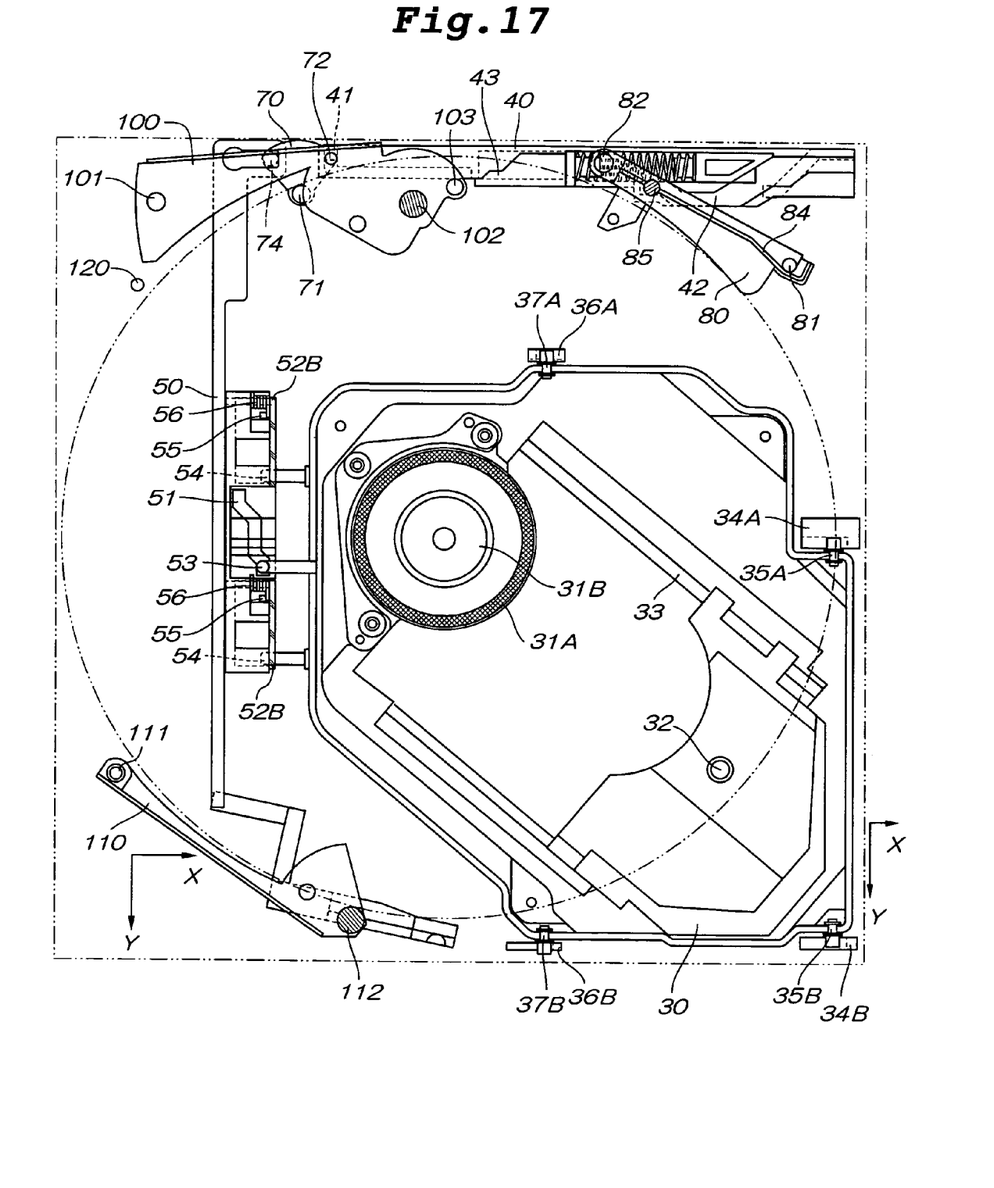
FIG. 17 is a plan view of an essential portion of a base body showing a state where a fourth predetermined time is elapsed after the state shown in FIG. 13 and showing a recording/replaying state of a disk.
Figure 18:
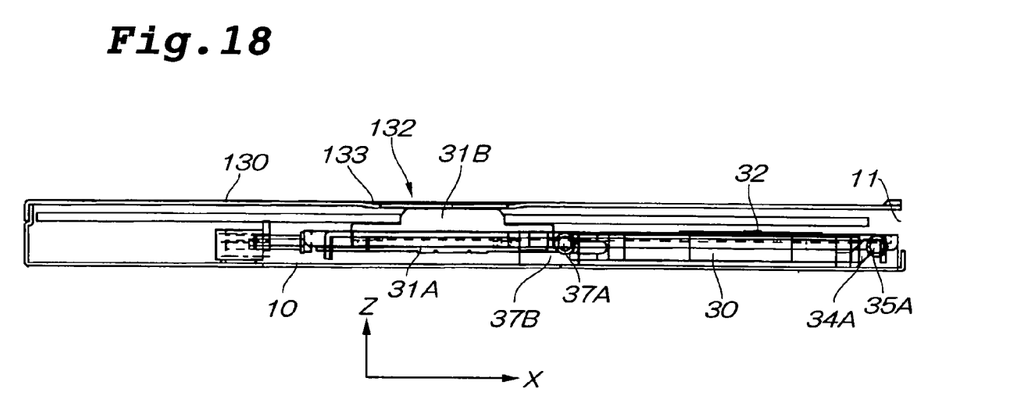
FIG. 18 is a side sectional view of an essential portion in the state.
Figure 19:
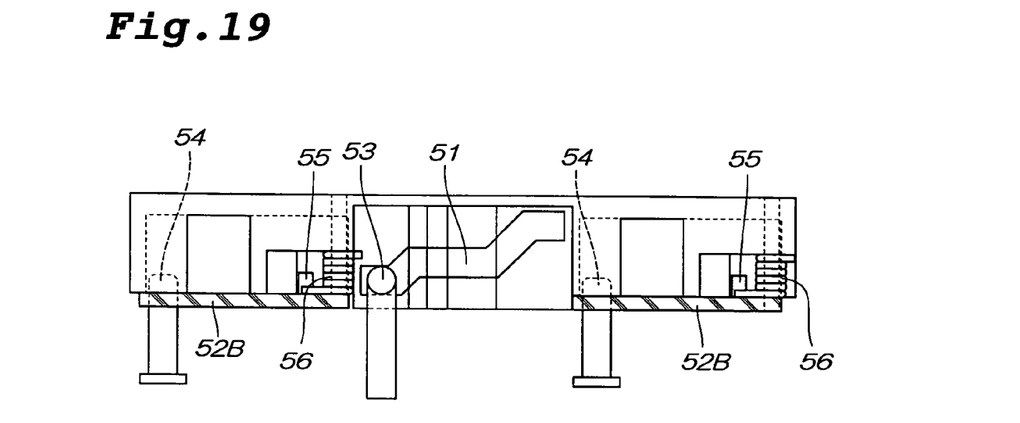
FIG. 19 is a plan view of a sub-slider in the state.
Figure 20:
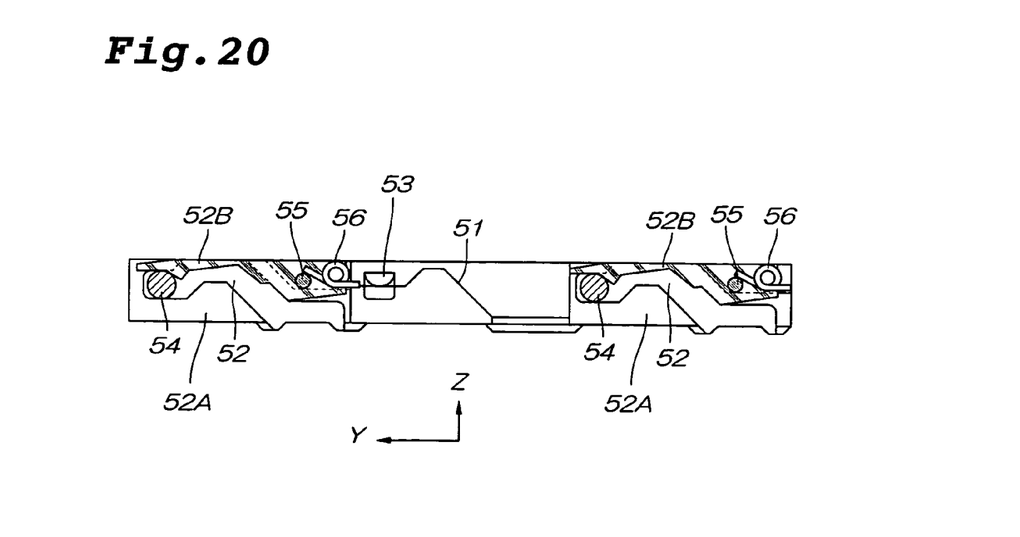
FIG. 20 is a side view of the sub-slider in the state.

FIG. 17 is a plan view of an essential portion of a base body showing a state where a fourth predetermined time is elapsed after the state shown in FIG. 13 and showing a recording/ replaying state of a disk, FIG. 18 is a side sectional view of an essential portion in the state, FIG. 19 is a plan view of a sub-slider in the state, and FIG. 20 is a side view of the sub-slider in the state.

In the loading completion state of the disk, as shown in FIGS. 1 to 4, the traverse 30 is disposed at the rearmost position closest to the base body 10.

That is, in this state, the slide pin 53 is located on one end (close to the main slider 40) of the slider cam mechanism 51. Therefore, the traverse 30 is disposed at a position close to the rearmost side. The cam pins 35A and 35B are located on the ends of the other ends of the grooves of the fixing cams 34A and 34B. Therefore, the other end (close to the pickup 32) of the traverse 30 is disposed at a position closest to the base body 10. The vertically moving pin 54 is located at one end (close to the main slider 40) of the vertically moving cam mechanism 52. Therefore, the one end (close to the spindle motor 31A) of the traverse 30 is disposed at a position closest to the base body 10. The other end of the second cam portion 52B is downwardly biased by the resilient member 56, and is maintained in the downwardly biased state.

The main slider 40 moves toward the disk inserting opening 11 from the state shown in FIG. 1, and with the movement of the main slider 40, the sub-slider 50 moves toward the main slider 40.

In a state where the chucking motion is carried out for the first predetermined time, the traverse 30 moves toward the disk inserting opening 11 by a first X axis distance, and the other end of the traverse 30 is disposed at a location away from the base body 10 by a first Y axis distance.

That is, in this state, the slide pin 53 moves the slider cam mechanism 51 by the first Y axis distance, and the traverse 30 moves toward the disk inserting opening 11 by the first X axis distance. Thus, the cam pins 35A and 35B move toward the ends of one ends of the grooves of the fixing cams 34A and 34B by the first X axis distance, and the other end (close to the pickup 32) of the traverse 30 is disposed at a location away from the base body 10 by a first Z axis distance. The vertically moving pin 54 moves from one end (close to the main slider 40) of the vertically moving cam mechanism 52 by the first Y axis distance. Since the grooves located in the range of the first Y axis distance have the same heights, the one end (close to the spindle motor 31A) of the traverse 30 is held at a position closest to the base body 10. The other end of the second cam portion 52B is downwardly biased by the resilient member 56, and is maintained in the downwardly biased state.

The main slider 40 further moves toward the disk inserting opening 11 from the state shown in FIG. 5, and with this, the sub-slider 50 further moves toward the main slider 40.

In a state where the chucking motion is further carried out for a second predetermined time from the state shown in FIG. 5, the other end of the traverse 30 is disposed at a location away from the base body 10 by a second Z axis distance (second Z axis distance>first Z axis distance) as shown in FIGS. 9 to 12.

That is, in this state, the slide pin 53 moves the slider cam mechanism 51 by the second Y axis distance, but since the groove of the slider cam mechanism 51 is provided in parallel in the moving direction (Y axis direction) of the sub-slider 50, in this moving range of the slider cam mechanism 51 the traverse 30 does not move toward the disk inserting opening 11. Therefore, the cam pins 35A and 35B do not also move in the grooves of the fixing cams 34A and 34B. The vertically moving pin 54 moves in the groove of the vertically moving cam mechanism 52 by the second Y axis distance, and moves the one end (close to the spindle motor 31A) of the traverse 30 from the base body 10 by the second Z axis distance. At that time, the second cam portion 52B is moved upward by the vertically moving pin 54. The second cam portion 52B biases downwardly the vertically moving pin 54 by the resilient member 56.

If the main slider 40 moves toward the disk inserting opening 11 from the state shown in FIG. 9, the sub-slider 50 further moves toward the main slider 40.

In a state where the chucking motion is carried out for a third predetermined time from the state shown in FIG. 9, the other end of the traverse 30 is disposed at a position of a third Z axis distance which is most separated from the base body 10 as shown in FIGS. 13 to 16.

That is, in this state, the slide pin 53 moves the slider cam mechanism 51 by a third Y axis distance, but since the groove of the slider cam mechanism 51 is provided in parallel in the moving direction (Y axis direction) of the sub-slider 50, in this moving range of the slider cam mechanism 51 the traverse 30 does not move toward the disk inserting opening 11. Therefore, the cam pins 35A and 35B do not also move in the grooves of the fixing cams 34A and 34B. The vertically moving pin 54 moves in the groove of the vertically moving cam mechanism 52 by the third Y axis distance, and moves the one end (close to the spindle motor 31A) of the traverse 30 from the base body 10 by the third Z axis distance (highest position). In this state, the chucking of the disk by the hub 31B is completed. At that time, the vertically moving pin 54 assume the highest position in the cam groove, and the second cam portion 52B is pushed upward to the highest position by the vertically moving pin 54. The second cam portion 52B downwardly biases the vertically moving pin 54 by the resilient member 56.

If the main slider 40 further moves toward the disk inserting opening 11 from the state shown in FIG. 13, the sub-slider 50 further moves toward the main slider 40.

As shown in FIGS. 17 to 20, the traverse 30 moves toward the disk inserting opening 11, the other end of the traverse 30 moves in a direction approaching the base body 10, and is disposed at a position of the first Z axis distance.

That is, in this state, the slide pin 53 moves the slider cam mechanism 51 by a fourth Y axis direction, and the traverse 30 moves toward the disk inserting opening 11 by the second Z axis distance. Therefore, the cam pins 35A and 35B move toward the ends of the one ends of the grooves of the fixing cams 34A and 34B by the second X axis distance, but the height of the other end (close to the pickup 32) of the traverse 30 is not varied. The vertically moving pin 54 moves in the groove of the vertically moving cam mechanism 52 by the fourth Y axis direction to move the one end (close to the spindle motor 31A) of the traverse 30 toward the base body 10, and disposes the one end at a location of the first Z axis distance. In this state, the second cam portion 52B moves downward by the biasing force of the resilient member 56 by the lowering motion of the vertically moving pin 54.

Through the above-described motion, the disk is separated from the lid 130 and also from the fixing pin 120, and the disk is brought into a replay/recording state.

When the loaded disk is to be discharged, the loading motor is driven, the main slider 40 is moved toward its other end, and basically the above-described motion is carried out reversely.

Figure 21:
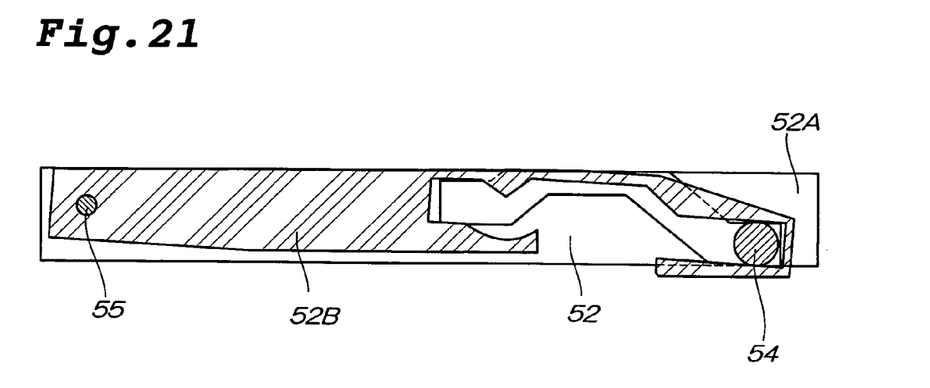
FIG. 21 is a side view showing a structure of an essential portion of a sub-slider according to another embodiment of the present invention.
Figure 22:
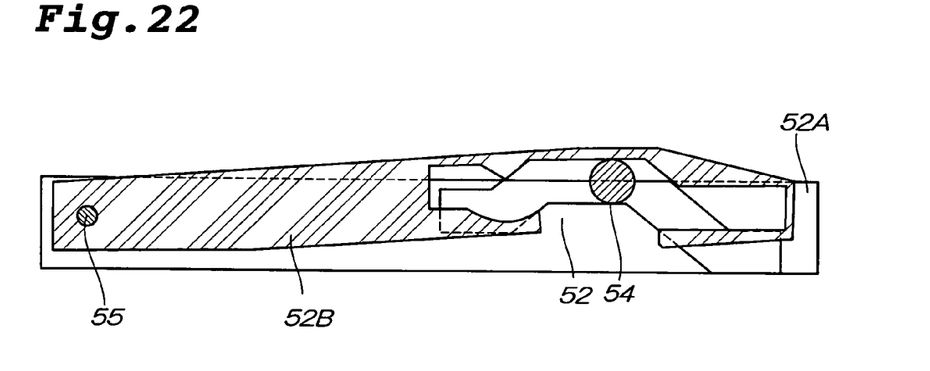
FIG. 22 is a side view showing a structure of an essential of the sub-slider in a state where the traverse is moved to the highest position of the embodiment.
Figure 23:
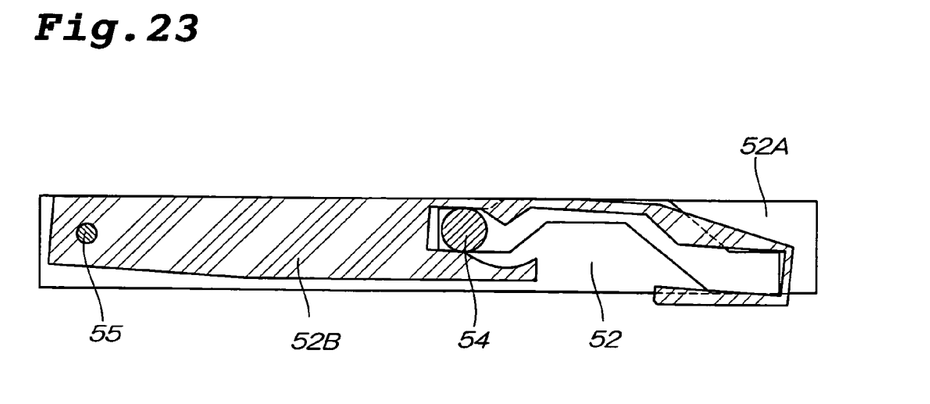
FIG. 23 is a side view showing a structure of an essential of the sub-slider in a recording/replaying state of the disk of the embodiment.

Next, a structure of a sub-slider of another embodiment will be explained. FIG. 21 is a side view showing a structure of an essential portion of the sub-slider, FIG. 22 is a side view showing a structure of an essential of the sub-slider in a state where the traverse is moved to the highest position of the embodiment, and FIG. 23 is a side view showing a structure of an essential of the sub-slider in a recording/replaying state of the disk of the embodiment. That is, FIG. 21 corresponds to positions of the cam mechanism and the pin in FIG. 4, FIG. 22 corresponds to positions of the cam mechanism and the pin in FIG. 16, and FIG. 23 corresponds to positions of the cam mechanism and the pin in FIG. 20.

The vertically moving cam mechanism 52 comprises a first cam portion 52A and a second cam portion 52B which is displaced with respect to the first cam portion 52A. One end of the second cam portion 52B is turnably held on the first cam portion 52A by a turning fulcrum 55, and the other end of the second cam portion 52B can vertically move. A cam groove of the vertically moving cam mechanism 52 is formed of upper and lower sides of the first cam portion 52A, and upper and lower sides of the second cam portion 52B. Therefore, the first cam portion 52A and the second cam portion 52B limit lower and upper surfaces of the vertically moving pin 54. That is, in this embodiment, the lower side of the second cam portion 52B is provided with a lower limiting cam wall which limits the lower side of the vertically moving pin 54, and when the height of the vertically moving pin 54 is equal to or lower than a predetermined value in the cam groove, the vertically moving pin 54 presses the lower limiting cam wall of the second cam portion 52B, and holds the second cam portion 52B in its lowered position.

Therefore, according to the embodiment, it is possible to move the second cam portion 52B downward by the vertically moving pin 54 without using the resilient member 56 like the previous embodiment.

Figure 24:
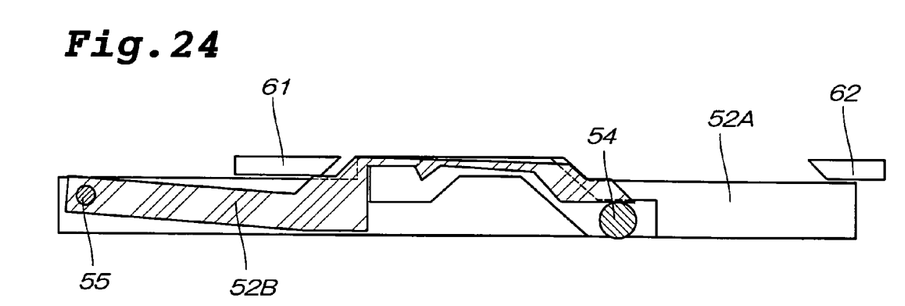
FIG. 24 is a side view showing a structure of an essential portion of a sub-slider according to another embodiment of the present invention.
Figure 25:
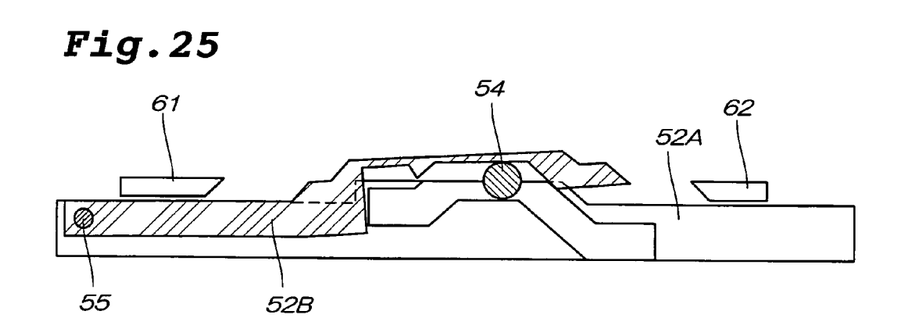
FIG. 25 is a side view showing a structure of an essential of the sub-slider in a state where the traverse is moved to the highest position of the embodiment.
Figure 26:
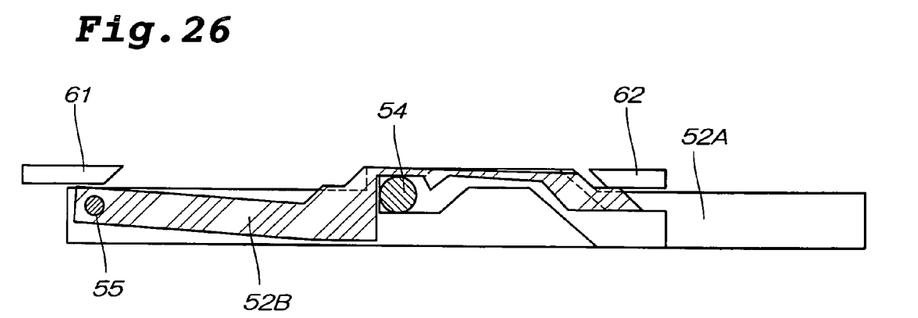
FIG. 26 is a side view showing a structure of an essential of the sub-slider in a recording/replaying state of the disk of the embodiment.

Next, a structure of a sub-slider of another embodiment of the present invention will be explained. FIG. 24 is a side view showing a structure of an essential portion of a sub-slider according to another embodiment of the present invention, FIG. 25 is a side view showing a structure of an essential of the sub-slider in a state where the traverse is moved to the highest position of the embodiment, and FIG. 26 is a side view showing a structure of an essential of the sub-slider in a recording/replaying state of the disk of the embodiment. That is, FIG. 24 corresponds to positions of the cam mechanism and the pin in FIG. 4, FIG. 25 corresponds to positions of the cam mechanism and the pin in FIG. 16, and FIG. 26 corresponds to positions of the cam mechanism and the pin in FIG. 20.

The vertically moving cam mechanism 52 comprises a first cam portion 52A, and a second cam portion 52B which is displaced with respect to the first cam portion 52A. One end of the second cam portion 52B is turnably held on the first cam portion 52A by a turning fulcrum 55, and the other end of the second cam portion 52B can vertically move. The cam groove of the vertically moving cam mechanism 52 is formed of upper and lower sides of the first cam portion 52A, and an upper side of the second cam portion 52B. Therefore, the first cam portion 52A limits lower and upper surfaces of the vertically moving pin 54, and the second cam portion 52B limits an upper surface of the vertically moving pin 54. The base body is provided with limiting members 61 and 62 for limiting a vertical direction of the second cam portion 52B. An upper end surface of the second cam portion 52B constitutes a receiver which receives the limiting members 61 and 62. As shown in FIGS. 24 and 25, in a state where the vertically moving pin 54 does not push up the second cam portion 52B, the limiting members 61 and 62 press the receiver of the second cam portion 52B, thereby holding the second cam portion 52B in its lowered position.

Therefore, according to the embodiment, it is possible to move the second cam portion 52B downward by the limiting members 61 and 62 without using the resilient member 56 like the previous embodiment.

According to the present invention, it is possible to reduce a disk apparatus in thickness and size without being affected by the height of a vertically moving cam mechanism.

INDUSTRIAL APPLICABILITY

A disk apparatus of this embodiment is used for a disk apparatus which is incorporated in or attached additionally to a personal computer having display means, input means, processing means and the like, and is especially effective for a notebook personal computer which display means, input means, processing means and the like are integrally provided with.

What is claimed is:

1. A disk apparatus comprising a chassis outer sheath having a base body and a lid, in which
    a front surface of said chassis outer sheath is formed with a disk inserting opening into which a disk is directly inserted, a spindle motor and a pickup are held by a traverse provided on said base body,
    a slider mechanism is disposed on one end of said traverse,
    said slider mechanism includes a vertically moving cam mechanism which brings said traverse close to and away from said base body, wherein
    a cam groove of said vertically moving cam mechanism comprises a first cam portion which moves together with said slider mechanism and a second cam portion which is displaced with respect to said first cam portion,
    when a vertically moving pin of said vertically moving cam mechanism exceeds a predetermined height in said cam groove, said second cam portion rises and said second cam portion limits movement of said vertically moving pin, and when said vertically moving pin is equal to or lower than the predetermined height in said cam groove, said second cam portion is held at its lowered position.

2. The disk apparatus according to claim 1, wherein when said vertically moving pin exceeds the predetermined height in said cam groove, said second cam portion rises to a height where said cam groove is formed, and said vertically moving pin is limited by a spring or a stopper so that said vertically moving pin does not rise more than a height at which said cam groove is formed.

3. The disk apparatus according to claim 1, wherein said second cam portion limits an upper surface of said vertically moving pin.

4. The disk apparatus according to claim 1, wherein one end of said second cam portion is turnably held by said first cam portion so that the other end of said second cam portion can vertically move, a resilient member downwardly biases the other end of said second cam portion.

5. The disk apparatus according to claim 4, wherein said second cam portion is downwardly biased using said resilient member.

6. The disk apparatus according to claim 1, wherein a portion of said second cam portion is provided with a lower limiting cam wall which limits a lower side of said vertically moving pin, and when said vertically moving pin is equal to or lower than the predetermined height in said cam groove, said vertically moving pin presses said tower limiting cam wall of said second cam portion, and holds said second cam portion in its lowered position.

7. The disk apparatus according to claim 1, wherein said base body is provided with a limiting member for limiting a vertical direction of said second cam portion, said second cam portion is provided with a receiver for receiving said limiting member, and by forward and backward motion of said second cam portion, at a predetermined position, said limiting member presses said receiver of said second cam portion, thereby holding said second cam portion in its lowered position.

8. The disk apparatus according to claim 1, wherein said base body is provided with said second cam portion and with this, said second cam portion does not move together with said slider mechanism.

9. A disk apparatus in which
    a slider mechanism is disposed on one end of a traverse,
    said slider mechanism includes a vertically moving cam mechanism which brings one end of said traverse close to and away from said base body, wherein
    a cam groove of said vertically moving cam mechanism comprises a first cam portion which moves together with said slider mechanism and a second cam portion which is displaced with respect to said first cam portion to limit an upper surface of a vertically moving pin,
    when said vertically moving pin of said vertically moving cam mechanism exceeds a predetermined height in said cam groove, said second cam portion rises and said second cam portion limits movement of said vertically moving pin, and when said vertically moving pin is equal to or lower than the predetermined height in said cam groove, said second cam portion is held at its lowered position.

\* \* \* \* \*